(12) United States Patent
Akemakou

(10) Patent No.: US 6,396,181 B1
(45) Date of Patent: May 28, 2002

(54) ROTATING MACHING WITH ADVANCED EXCITATION MEANS

(75) Inventor: Dokou Antoine Akemakou, Vitry-sur-Seine (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 09/700,790
(22) PCT Filed: Mar. 27, 2000
(86) PCT No.: PCT/FR00/00758
§ 371 (c)(1), (2), (4) Date: Nov. 20, 2000
(87) PCT Pub. No.: WO00/59099
PCT Pub. Date: Oct. 5, 2000

(30) Foreign Application Priority Data

Mar. 26, 1999 (FR) ............................................ 99 03810

(51) Int. Cl.⁷ ............................................. H02K 21/12
(52) U.S. Cl. .............................. 310/156.1; 310/156.66; 310/156.69; 310/187; 310/263; 310/269; 310/156.38; 310/156.43; 310/156.54
(58) Field of Search ........................ 310/156.01, 156.66, 310/156.68, 156.69, 156.72, 156.73, 184, 185, 187, 269, 49 R, 263, 156.43, 156.47, 156.54, 156.44, 156.38, 156.41

(56) References Cited

U.S. PATENT DOCUMENTS

| | | | | |
|---|---|---|---|---|
| 5,132,581 A | * | 7/1992 | Kusase | 310/263 |
| 5,298,827 A | * | 3/1994 | Sugiyama | 310/156 |
| 5,386,161 A | * | 1/1995 | Sakamoto | 310/49 R |
| 5,682,073 A | | 10/1997 | Mizuno | 310/165 |
| 5,780,953 A | * | 7/1998 | Umeda et al. | 310/263 |
| 5,825,116 A | * | 10/1998 | Ishikawa | 310/263 |
| 5,886,451 A | * | 3/1999 | Hatsios et al. | 310/263 |
| 5,892,313 A | * | 4/1999 | Harris et al. | 310/263 |
| 5,962,947 A | * | 10/1999 | Suzuki et al. | 310/257 |
| 5,965,967 A | * | 10/1999 | Liang et al. | 310/263 |
| 6,002,194 A | * | 12/1999 | Asao | 310/269 |

FOREIGN PATENT DOCUMENTS

EP 0741444 11/1996

* cited by examiner

Primary Examiner—Nestor Ramirez
Assistant Examiner—Thanh Lam
(74) Attorney, Agent, or Firm—Liniak, Berenato, Longacre & White

(57) ABSTRACT

A rotary electrical machine, comprising a stator (100) having at least one armature winding (140) mounted in slots which define stator poles, and a rotor (200) mounted for rotation inside the stator, the rotor having at its outer periphery magnetic poles comprising, firstly, North-South magnets (210N–210S), and secondly, magnetic reluctance pieces (215–215'), wherein the North-South magnets of two consecutive n, n+1 poles are grouped side by side, and in that the magnetic reluctance pieces of two consecutive n+1, n+2 poles are also side by side.

16 Claims, 5 Drawing Sheets

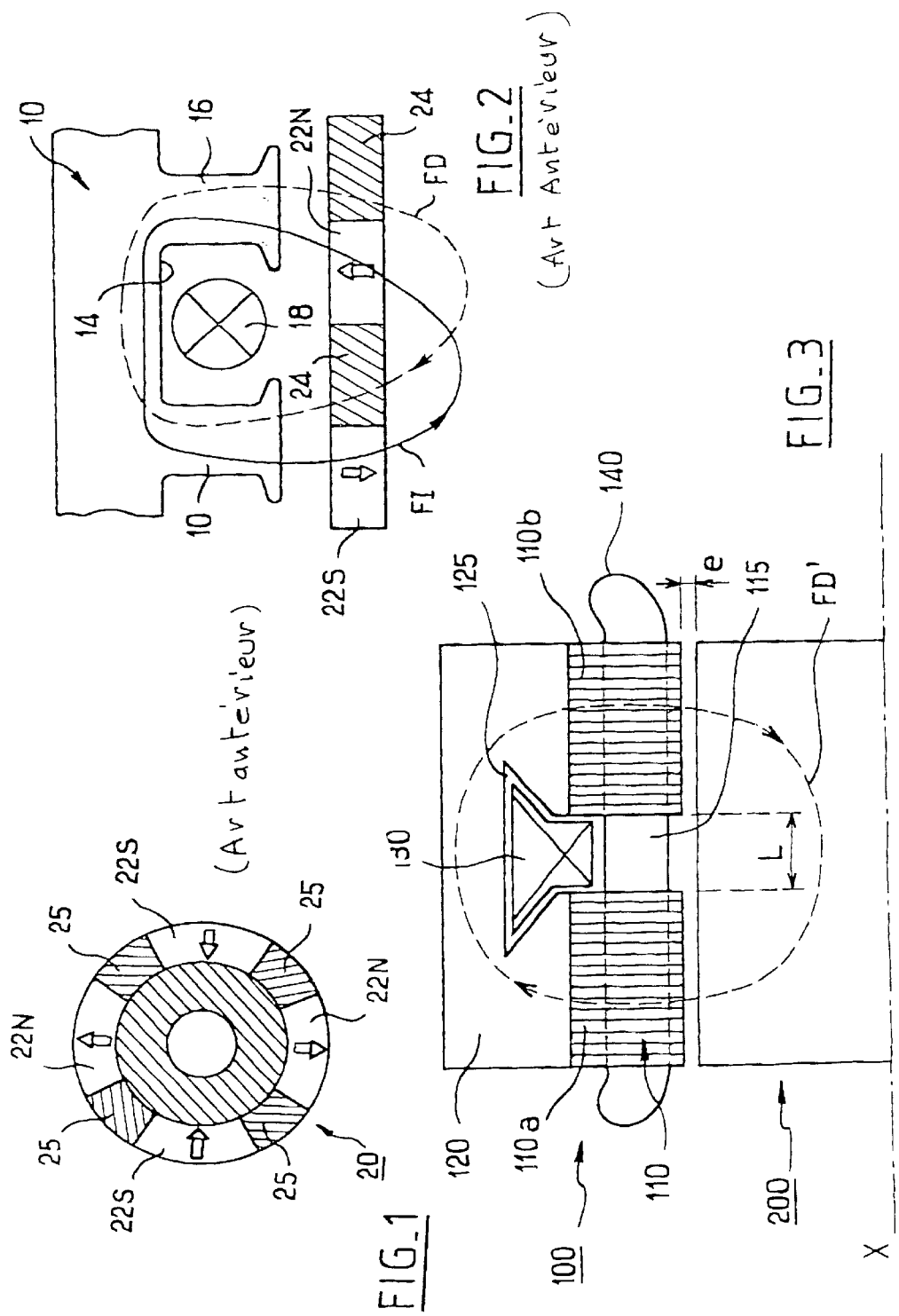

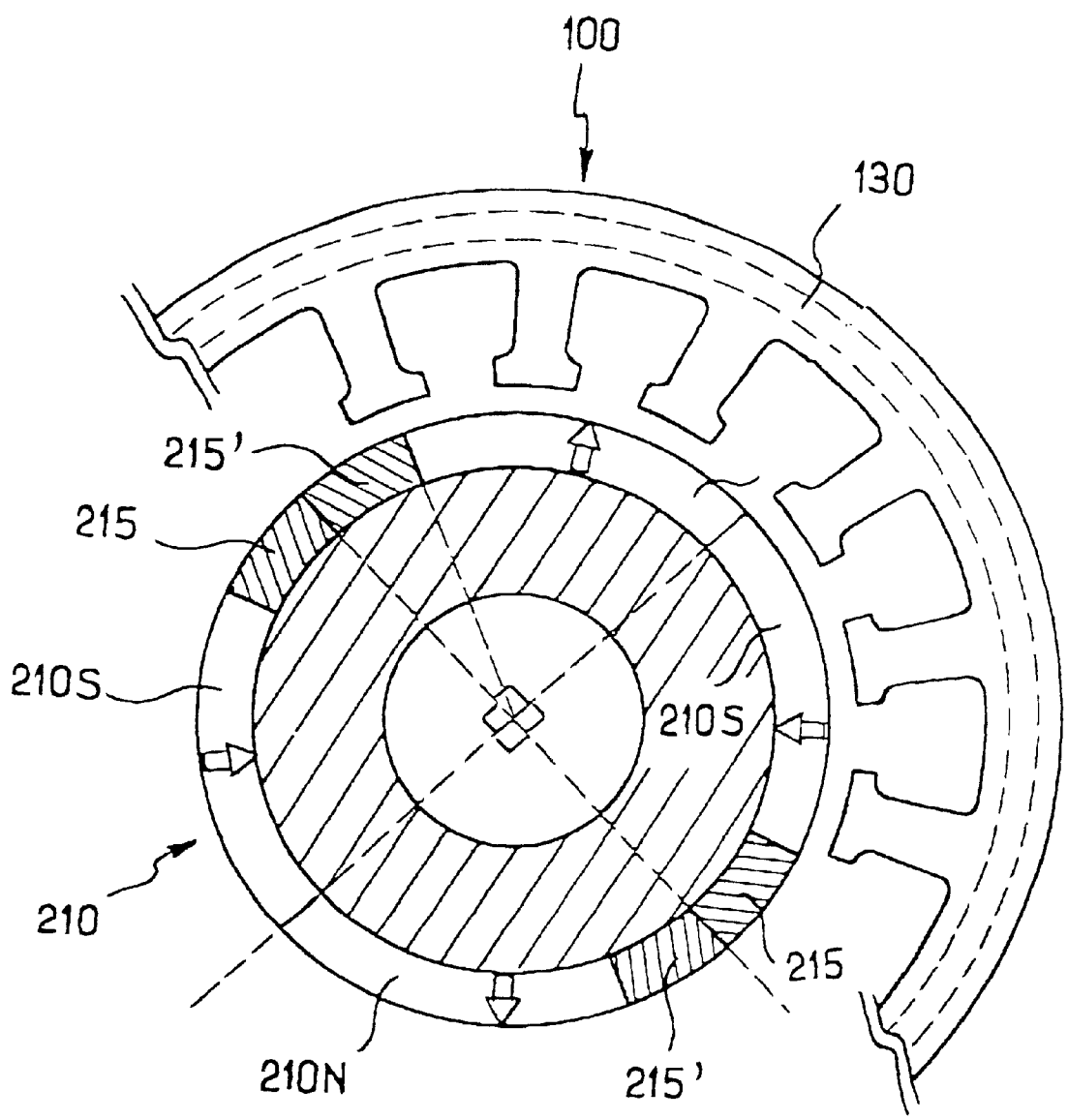
FIG_4

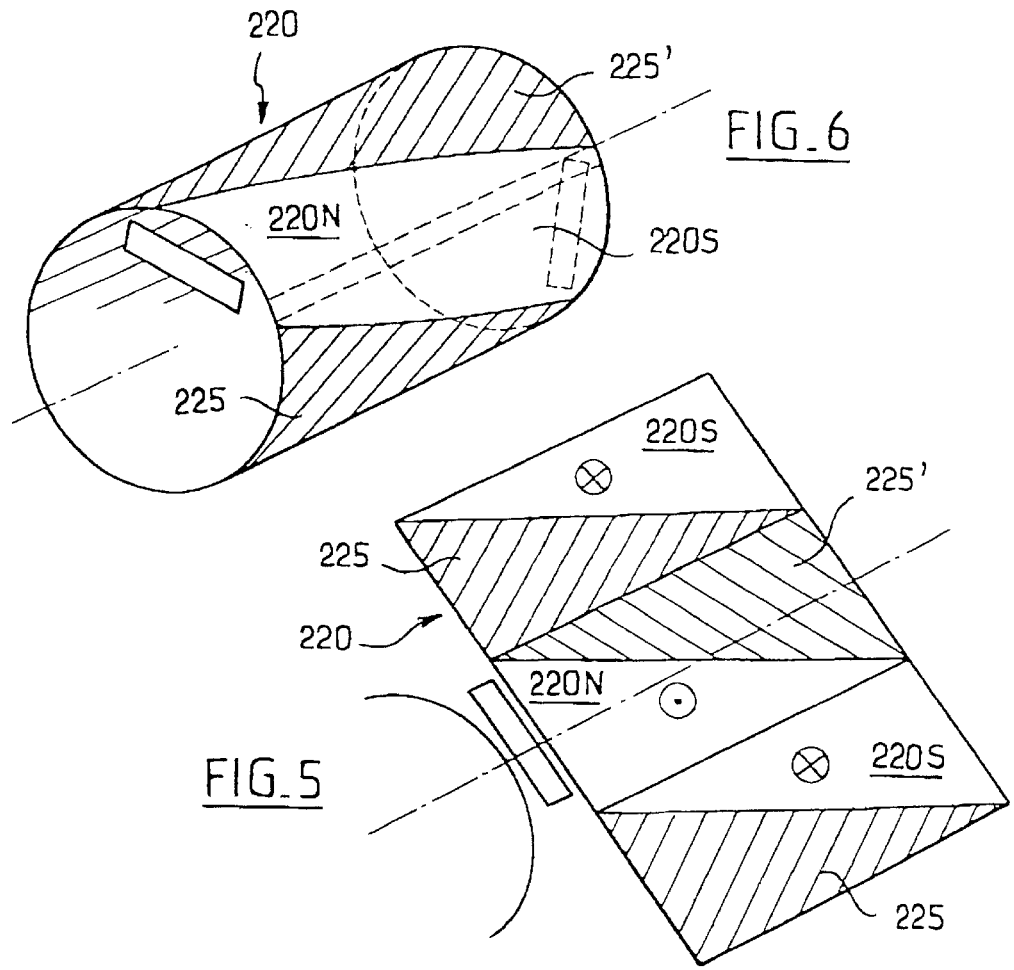
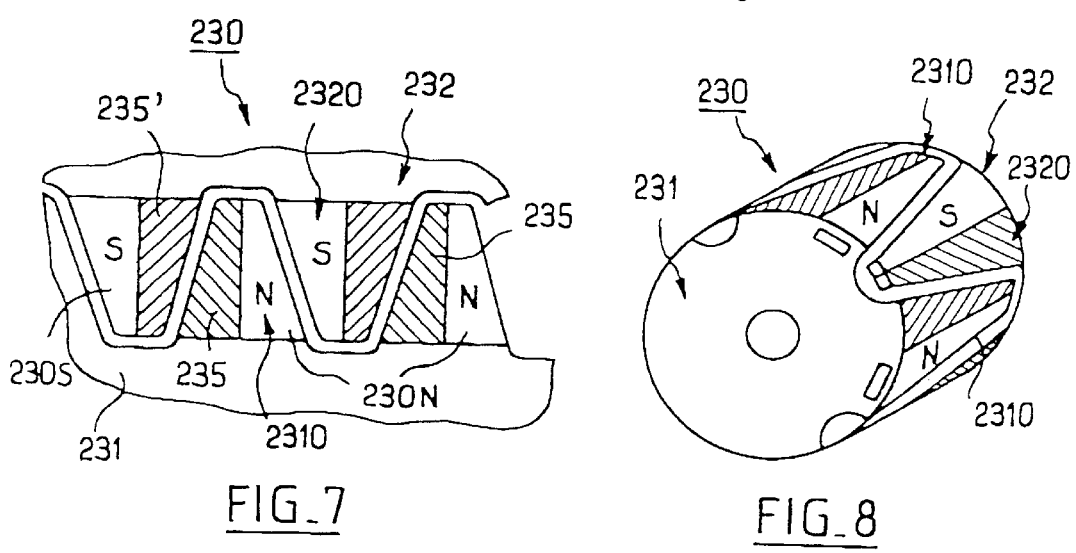

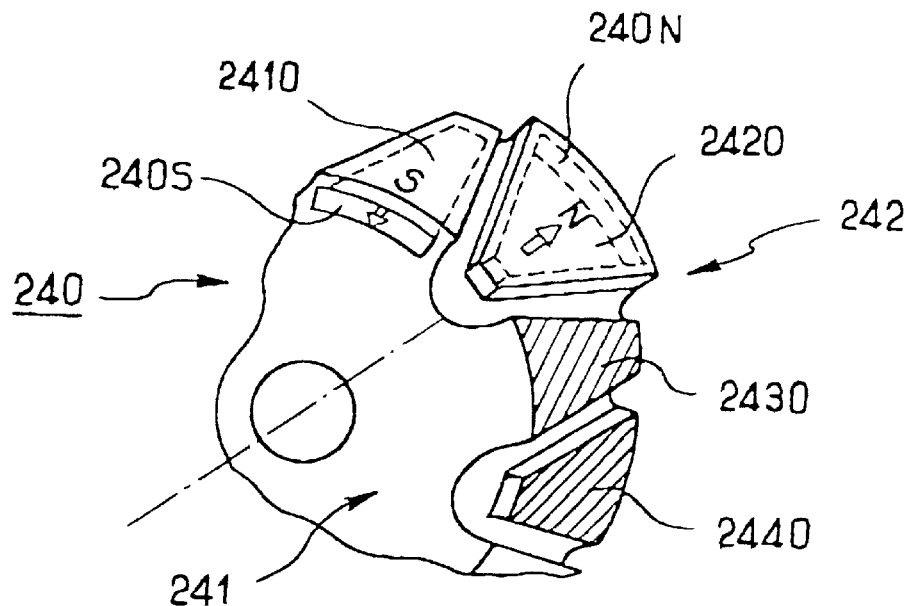
FIG_9
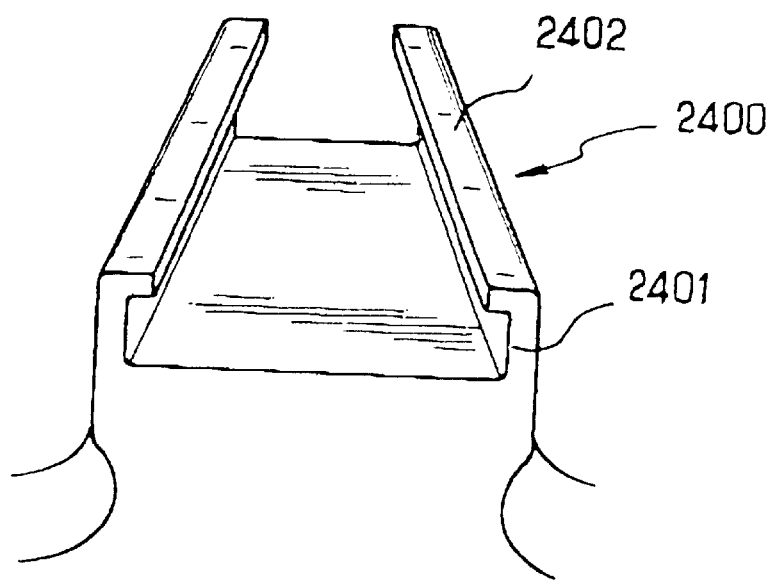
FIG_11

ROTATING MACHING WITH ADVANCED EXCITATION MEANS

BACKGROUND OF THE INVENTION

1. Field of the Invention

The present invention relates in general terms to rotary electrical machines, and in particular to a synchronous rotary machine having a permanent magnet rotor, such as an alternator or alternator-starter for a motor vehicle.

2. Description of Related Art

It is already known in the state of the art to provide rotary machines in which the rotor has a set of permanent magnets, which are for example arranged on the surface or inset a certain distance below the surface of the rotor, so as to define an appropriate pattern of South and North poles.

Because the excitation of such a machine is imposed permanently by the rotor magnets, it is necessary to provide, in the case of an alternator, arrangements for adjusting the electrical power delivered by the machine to output load: in this connection, power output is currently linked to loads in which consumption varies over time.

In the case of motor vehicle alternators, the load connected to the armature of the alternator can, in this context, vary greatly, and may even be zero or substantially zero while the inductive rotor of the alternator is in motion.

In order to adjust the electrical power delivered by the rotary machine, one known solution consists in interposing magnetic defluxing parts between the magnets of the rotor in order to channel part of the magnetic flux flowing between the rotor and the stator. This defluxing flux does not contribute to the generation of current by the windings of the stator armature. The intensity of this flux adjusts itself as a function of the load imposed on the armature output.

One known defluxing solution is accordingly illustrated in FIG. 1, in which a rotor 20 comprises magnets 22S which define South poles, and magnets 22N defining North poles, arranged alternately. This known solution consists in interposing between each pair of adjacent magnets a magnetic defluxing piece 25, these pieces being adapted to cooperate with the poles of the stator in order to produce defluxing.

Also illustrated, in FIG. 2 in a developed form, is the diagrammatic behaviour of this rotor in cooperation with a stator 10 having teeth 16 delimited by slots 14 which contain armature windings 18, with an induced flux F1 created by the magnets and an inverse defluxing flux FD. It will be noted in this Figure that the induced flux and the defluxing flux are poorly individualised. It has been found that this partial superimposition on each others induced fluxes and the defluxing fluxes flowing in opposite directions, limits the defluxing capacity of the machine, and therefore the range of possible excitations of the machine.

SUMMARY OF THE INVENTION

The object of the invention is to enable rotary machines to be made which deliver electrical energy that is optimised as a function of the load connected to the armature of the machine.

In order to achieve this object, the invention proposes a rotary electrical machine, comprising a stator having at least one armature winding located in slots defining stator poles, and a rotor mounted for rotation inside the stator, the rotor having at its outer periphery magnetic poles comprising, firstly, North-South magnets, and secondly, magnetic reluctance pieces, wherein the North-South magnets of two consecutive poles n, n+1 are grouped side by side, and in that the magnetic reluctance pieces of two consecutive poles n+1, n+2 are also side by side.

In order to achieve the said object, the invention also proposes a rotary electrical machine, comprising a stator having a single armature winding located in slots defining stator poles, and a rotor mounted for rotation inside the stator, the rotor having at its outer periphery magnetic poles comprising, firstly, North-South magnets, and secondly, magnetic reluctance pieces, wherein the North-South magnets of two consecutive poles n, n+1 are grouped side by side, and in that the magnetic reluctance pieces of two consecutive poles n+1, n+2 are also side by side.

Thanks to the invention, high quality defluxing is obtained in the machine, because the flux induced by the magnets on the one hand, and the defluxing flux on the other hand, are individualised better than in the known versions. It has also been found that this arrangement has the advantage that it leads to a reduction in variations of torque during operation of the machine.

Preferred but not limiting aspects of the rotary machine according to the invention are as follows:
- the stator includes an excitation winding which is fixed around the stator, the stator having two magnetic parts separated by a non-magnetic region in line with the excitation winding on the inner side of the latter,
- a magnetic member is arranged, surrounding the said magnetic parts of the stator and in contact with them, in such a way as to enable the said magnetic path to be closed in the stator, the said magnetic member having a slot for receiving the excitation winding,
- the axial width of the non-magnetic region is substantially greater than the width of the airgap separating the rotor from the stator,
- the magnets of the rotor are disposed asymmetrically with respect to the centre plane transverse to the axis (X) of rotation of the rotor which is situated in line with the excitation winding,
- the magnets of the rotor occupy a space the width of which, in a direction tangential to the rotor, varies with displacement in a direction parallel to the axis (X) of rotation of the rotor,
- the said at least one global excitation winding is connected to a variable electrical power supply such that the magnetic flux generated by the said global excitation winding is able to reinforce the fluxes induced between the rotor and the stator,
- means are provided for reversing the sign of the power supply of the global excitation winding, in such a way that the magnetic flux generated by the global excitation winding reduces the fluxes induced in the stator,
- the rotor has, in its tangential direction, a distribution of polar parts with a permanent magnet or magnets, the or each magnet defining two poles the polarity of which is imposed by a magnet or magnets, and polar reluctance parts each defining two poles having free polarities,
- the magnets are magnets with essentially radial flux,
- the magnets are ferrite magnets,
- the magnets are rare earth magnets,
- the magnets are ferrite and rare earth magnets,
- the rotary electrical machine consists of a motor vehicle alternator-starter.

BRIEF DESCRIPTION OF THE DRAWING

Further aspects, objects and advantages of the present invention will appear more clearly on a reading of the following detailed description of various embodiments of the latter given by way of non-limiting example and with reference to the attached drawings, in which, besides FIGS. 1 and 2 which have already been described:

FIG. 3 is a diagrammatic half view in axial cross section of a first embodiment of a machine in accordance with the invention, showing the general principle of operation of the invention which makes use of a so-called "global" excitation winding, FIG. 4 is a diagrammatic view of part of a rotary machine in accordance with the invention, FIG. 5 is a developed view, in plan, of a first embodiment of a rotor adapted for use in a machine according to the invention, FIG. 6 is a perspective view of the rotor corresponding to the developed view in FIG. 5, FIG. 7 is a developed view, in plan, of a second embodiment of a rotor adapted for use in a machine according to the invention, FIG. 8 is a perspective view of the rotor corresponding to the developed view in FIG. 7, FIG. 9 is a perspective view of a third embodiment of a rotor designed for use in a machine according to the invention, FIG. 11 is a detail view of a rotor arm in a machine according to the invention.

DETAILED DESCRIPTION OF THE PREFERRED EMBODIMENTS

Figure 10A:
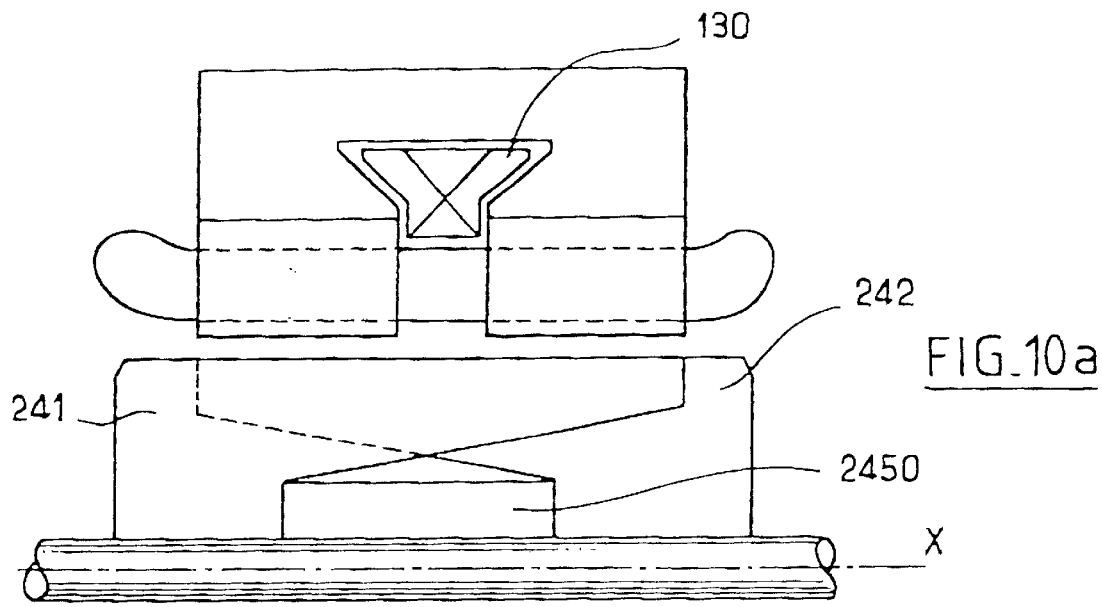
FIGS. 10a and 10b are two diagrammatic views showing part of a machine according to the invention making use of the rotor of FIG. 9.

The rotor structure may be of a known kind for a rotor such as that shown in FIGS. 1 and 2, making use of North and South poles arranged alternately and defined by permanent magnets which are separated by magnetic defluxing pieces. As will be seen later on in this text, the structure of the rotor may also be adapted in a specific way so as further to increase the defluxing capacities of the machine.

The stator 100 consists mainly of four elements:

- a stator carcass consisting of a stack 100 of generally annular stator laminations and surrounding the rotor. As will be seen later herein, the laminations may be of conventional geometry and may include on their inner periphery a set of slots similar to the slots 14 in FIG. 2, which are delimited by stator poles. The stator poles do not constitute an uninterrupted stack in the axial direction parallel to the axis X. Instead, the laminations are divided into two packs 110a and 110b, which are adjacent to the two respective axial ends of the machine, thereby defining a non-magnetic central space 115 which is open into the airgap. The space 115 can be left free (that is to say full of air), or it may consist of any known non-magnetic material,
- the stator is surrounded in the radial direction by a second annular magnetic carcass 120 which is a flux return member and with which the stator laminations are in contact. The carcass 120 includes on its inner periphery, and in a middle region considered axially, an annular cavity 125 which is in communication with the space 115,
- a so-called "global" excitation winding 130, which is supplied from a voltage source of variable sign and amplitude, and which is located within the cavity 125, and polyphase armature windings 140 which are wound on the stator poles. The windings 140 (the chignons of which are shown diagrammatically beyond the laminations which they surround) are conventional.

It will be understood that, when the excitation winding 130 is energised, it sets Lip in the region of the rotor, via the carcasses 120 and 110, a magnetic flux FD' which returns into the stator from one side with respect to the middle axial region, and leaves it on the other side. This flux is superimposed on the other fluxes that result from the interaction between the rotor and the stator.

In this connection it is important to observe that the width in the axial direction of the space 115, denoted L, is substantially greater than the thickness e of the airgap. This arrangement guarantees that the flux FD' generated by the excitation winding does not follow a path closed within the stator by passing directly between the packs of laminations 110a and 110b, the flux being forced to pass through the rotor.

Thus, the excitation winding 130 generates a flux FD' of substantially toroidal geometry between the stator and the rotor, and this flux is then able, especially with those examples of rotors which are described later herein, to modify the excitation of the machine in a way that is adjustable in accordance with the sign and amplitude of the power supply to the excitation winding.

In the case of a motor vehicle alternator, it is possible to design the rotor and stator in such a way as to produce, in the absence of the flux FD' generated by the global excitation winding 130, electrical energy which is less than that produced at full load.

The electrical energy delivered by the alternator is then adapted by adjusting the supply to the global excitation winding 130: this winding can thus be supplied with a voltage of a first sign in such a way as to reinforce the intensity of the aggregate flux in the armature when there is an increase in load.

Conversely, the winding 130 may be supplied with a voltage of opposite sign, so as to reduce the intensity of the aggregate flux in the armature when the load is decreased; to this end, the winding 130 and its power supply are designed as a function of the desired range of outputs.

The control means for this global excitation may make use of either a single switching transistor in the case of power supply of constant sign designed simply to reinforce the fluxes induced between the rotor and the stator, or an H bridge with four transistors in the case where it is desired to be able to reverse the sign of the supply to the global excitation winding 130.

With reference now to FIG. 4, this shows diagrammatically a rotary machine in accordance with the invention with its stator 100 enclosing a global excitation winding 130, the armature windings 140 not being shown in this Figure. The rotor 210 of this machine has at its periphery two pairs of magnets 210N, 210S, arranged alternately with two pairs of magnetic pieces 215 and 215'.

It is of course possible to provide a rotor with any number whatever of pairs of magnets arranged alternately with magnetic pieces.

With a rotor of this kind of structure, and in particular because of the side by side grouping of the permanent magnets corresponding to two successive poles n and n+1, and the grouping of the magnetic pieces corresponding to two successive poles n+1 and n+2, it is possible to obtain high quality defluxing of the machine because the induced fluxes, in the magnets on the one hand and defluxing pieces on the other hand, are individualised better than in the known embodiment in FIGS. 1 and 2. It has also been found that this arrangement has the advantage that it reduces variations in torque during operation of the machine.

Thus, with a high defluxing capacity it is possible to use the winding 130 solely in order to reinforce the flux, so that the winding can be supplied by a uni-directional current, which avoids the need to make use of an expensive H bridge.

With reference now to FIGS. 5 and 6, these show a first actual embodiment of a rotor which enables the global excitation winding 130 to be used for the purpose of modifying the excitation.

The rotor 220 accordingly has triangular magnets with radial flux. More precisely, a North magnet 220N has the general form of a right angled triangle, a major side of which is parallel to the axis of rotation, with a minor side of the triangle flush with one axial end of the rotor, so as to define a pole. This North magnet 220N is adjacent, on its major side, to the major side of a South magnet 220S which is oriented in head-to-toe relationship and which defines, through its minor side, a pole at the opposite end. Magnetic reluctance pieces 225, 225' extend along the magnets from their hypotenuses.

Preferably, the magnets made in the general form of right angled triangles, in particular, reduce the magnetic noise of the rotary electrical machine.

Here again any number whatsoever of pairs of magnets 220N, 220S can be provided, arranged alternately with a corresponding number of pairs of magnetic pieces.

As to FIGS. 7 and 8, these show the application of the present invention to the case of a rotor 230 with arms, in a second preferred embodiment of the rotor.

Such a rotor comprises, in the manner known per se, a first member 231 having a first set of generally triangular arms 2310 and a second member 232 having a second set of generally triangular arms 2320, these arms being interleaved with each other.

In this case, each arm 2310 in the first set has, in a given tangential direction (from left to right in FIG. 7), a magnetic reluctance piece 235 followed by a magnet 230N defining a North pole, while each arm 2320 in the second set has, in the same direction, a magnet 230S defining a South pole, followed by a magnetic reluctance piece 235'. Accordingly, we have here a structure of magnets and magnetic reluctance pieces similar to that in FIG. 4.

FIG. 9 shows an embodiment of the present invention with a rotor 240, having arms, in a third preferred embodiment of the rotor.

The rotor 240 includes, in the manner known per se, a first member 241 which is provided with a certain number of generally triangular arms 2410, and a second portion 242 which is provided with a certain number of generally triangular arms 2420, the arms 2410, 2420 being interleaved with each other.

In this case, there are provided, in the circumferential direction of the rotor, two reluctance arms and two magnet arms having surface or inset magnets 240S and 240N, so as to impose respective North and South polarities on it, and so on.

Figure 10B:
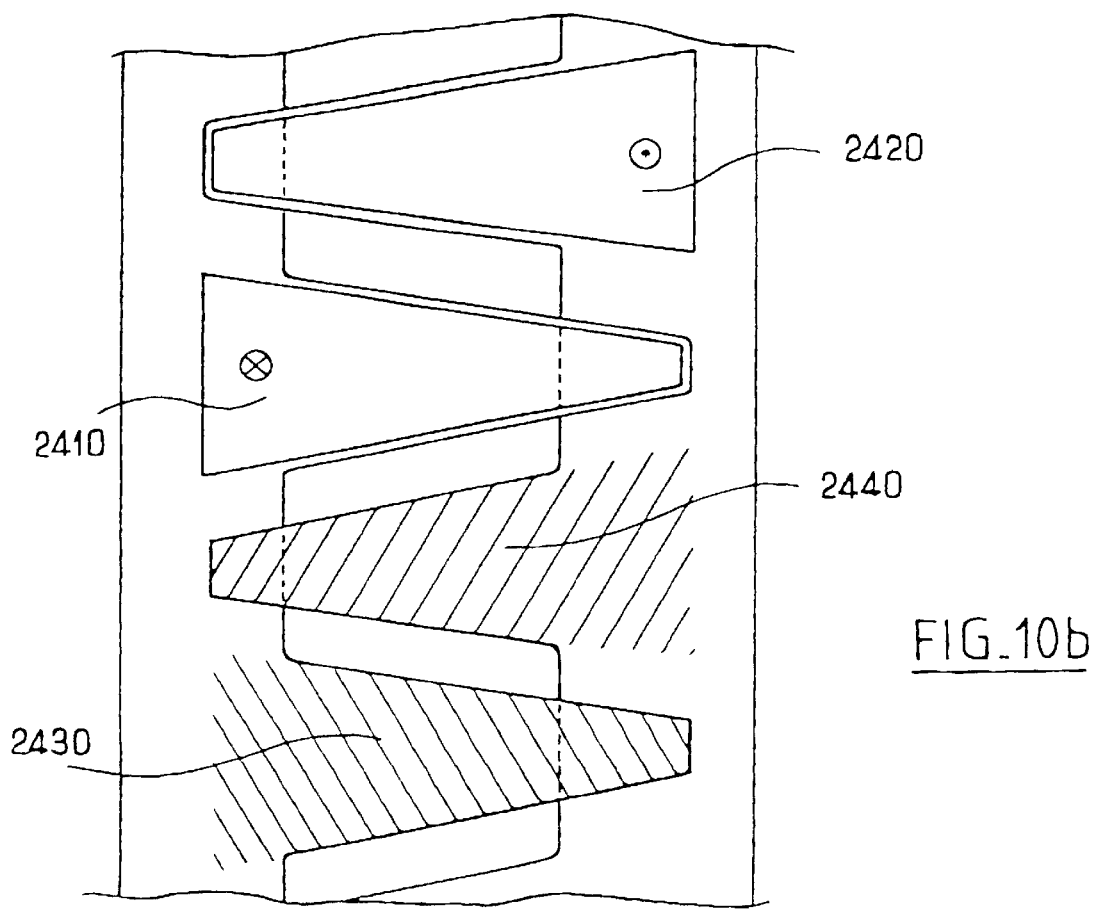

FIGS. 10a and 10b are, respectively, a half view in axial cross section of a machine in accordance with the invention which includes the rotor 240 having arms, which is described with reference to FIG. 9, and a developed view of part of that rotor, with a magnetic core 2450 coupling the pole pieces 241 and 242 together. These pole pieces can equally be of the half-core type.

It will be understood that the flux FD' created by the winding 130 reinforces (or reduces, according to its size) the total flux in the armature. In FIG. 10b, the flux FD' enters and leaves the rotor mainly through the poles of the reluctance arms, thereby avoiding the magnet poles due to the fact that the mean airgap equivalent to a path that would pass through the magnets is larger (it includes twice the thickness of a magnet).

Thus, in order to reinforce the total flux, the South magnet pole 2410 and North magnet pole 2420 will be followed in the configuration of FIG. 10b by a South reluctance pole 2430 and a North reluctance pole 2440, which corresponds to a regular South-North-South-North distribution of poles in a given direction of the excitation current.

In order to reduce the total flux in the armature, the sign of the current with which the winding 130 is supplied will be reversed, so as to give, in a configuration not shown in the drawings, a North reluctance pole 2430 and a South reluctance pole 2440, which corresponds to a South-North-North-South pole distribution. If the inverse current is such that the magnet poles have the same flux in absolute value as the flux of the reluctance poles, the total flux is zero, as is usable power.

The invention may also be employed in various rotary machines in which the rotor has to include magnetised or magnetic paths which do not extend strictly parallel to the axis of rotation of the rotor of the machine.

FIG. 11 shows one embodiment of the arms of the rotor 240 in the case where the latter carries surface magnets, the said surface magnets being then inserted within the arms.

It is thus possible to form the general profile of the side walls 241 of the arms 2400 by moulding, with the definitive form of the arms being made by machining the inside of the said side faces 2401 in such a way as to form returns 2402 which hold the magnets in place. As will have been understood, a stator of conventional type (not shown) which does not include global excitation means (130) could also be used in combination with a rotor, such as the rotors described in FIGS. 3 to 10b, having no global excitation means.

The present invention is of course in no way limited to the embodiments described and shown, but the person in this technical field will be able to apply to it any variations or modifications in accordance with its spirit.

It is thus possible according to the invention to provide a plurality of excitation windings such as the winding 130, distributed in a plurality of slots in the carcass 120, and the return flux paths between the stator and the rotor (which correspond in FIG. 3 to the two peripheral axial zones in which the respective packs of laminations 110a and 110b are close to the rotor) must then flank all of the excitation windings.

In addition, depending on the defluxing capacity desired, the proportion between the sectors with magnet poles and the sectors with reluctance poles provided on the rotor can be adjusted, and it is for example possible to provide a sector with two magnet poles, namely a North and South pole, an identical second sector with South and North magnet poles, a sector with two reluctance poles, and then once again two sectors each having two magnet poles, etc. In all cases, the preferred embodiments of rotor described above are clearly not limiting.

In general terms, depending on the defluxing capacity desired, the relative sizes of the magnets and magnetic reluctance pieces may be chosen at will.

What is claimed is:

1. A rotary electrical machine, comprising a stator (100) having at least one armature winding (140) located in slots defining stator poles, and a rotor (200, 210, 220, 230, 240)

mounted for rotation inside the stator, the rotor having at its outer periphery magnetic poles comprising, firstly, North-South magnets (210N–210S, 220N–220S, 230N–230S, 240N–240S), and secondly, magnetic reluctance pieces (215–215', 225–225', 235–235', 2430–2440), wherein the North-South magnets (210N–210S, 220N–220S, 230N–230S, 240N–240S) of two consecutive poles n, n+1 are grouped side by side, and in that the magnetic reluctance pieces (215–215', 225–225', 245–235', 2430–2440) of two consecutive poles n+1, n+2 are also side by side.

2. A rotary electrical machine according to claim 1, wherein the stator (100) includes an excitation winding (130) which is fixed around the stator, the stator having two magnetic parts (110a, 110b) separated by a non-magnetic region (115) in line with the excitation winding on the inner side of the latter.

3. A rotary electrical machine according to claim 2, wherein a magnetic member (120) is arranged, surrounding said magnetic parts (110a, 110b) of the stator and in contact with them, in such a way as to enable said magnetic path to be closed in the stator, said magnetic member (120) having a slot (125) for receiving the excitation winding (130).

4. A rotary electrical machine according to claim 2, wherein the axial width (L) of the non-magnetic region (115) is substantially greater than the width (e) of the airgap separating the rotor from the stator.

5. A rotary electrical machine according to claim 1, wherein the magnets of the rotor are disposed asymmetrically with respect to the center plane transverse to the axis (X) of rotation of the rotor which is situated in line with the excitation winding (130).

6. A rotary electrical machine according to claim 1, wherein the magnets of the rotor occupy a space the width of which, in a direction tangential to the rotor, varies with displacement in a direction parallel to the axis (X) of rotation of the rotor.

7. A rotary electrical machine according to claim 2, wherein said at least one global excitation winding (130) is connected to a variable electrical power supply such that the magnetic flux generated by said global excitation winding is able to reinforce the fluxes induced between the rotor and the stator.

8. A rotary electrical machine according to claim 7, wherein means are provided for reversing the sign of the power supply of the global excitation winding (130), in such a way that the magnetic flux generated by the global excitation winding reduces the fluxes induced in the stator.

9. A rotary electrical machine according to claim 1, wherein the rotor (240) has, in its tangential direction, a distribution of polar parts with a permanent magnet or magnets, the or each magnet defining two poles the polarity of which is imposed by a magnet or magnets, and polar reluctance parts each defining two poles having free polarities.

10. A rotary electrical machine according to claim 1, wherein the magnets are magnets with essentially radial flux.

11. A rotary electrical machine according to claim 1, wherein the magnets are ferrite magnets.

12. A rotary electrical machine according to claim 1, wherein the magnets are rare earth magnets.

13. A rotary electrical machine according to claim 1, wherein the magnets are ferrite and rare earth magnets.

14. A rotary electrical machine, comprising a stator (100) having a single armature winding (140) located in slots defining stator poles, and a rotor (200, 210, 220, 230, 240) mounted for rotation inside the stator, the rotor having at its outer periphery magnetic poles comprising, firstly, North-South magnets (210N–210S, 220N–220S, 230N–230S, 240N–240S), and secondly, magnetic reluctance pieces (215–215', 225–225', 235–235', 2430–2440), wherein the North-South magnets (210N–210S, 220N–220S, 230N–230S, 240N–240S) of two consecutive poles n, n+1 are grouped side by side, and wherein the magnetic reluctance pieces (215–215', 225–225', 245–235', 2430–2440) of two consecutive poles n+1, n+2 are also side by side.

15. A rotary electrical machine according to claim 1, wherein said machine consists of a motor vehicle alternator.

16. A rotary electrical machine according to claim 1, wherein said machine consists of a motor vehicle alternator-starter.

* * * * *